United States Patent
He et al.

(10) Patent No.: US 9,219,280 B2
(45) Date of Patent: Dec. 22, 2015

(54) CURRENT COLLECTOR, ELECTRODE OF ELECTROCHEMICAL BATTERY, AND ELECTROCHEMICAL BATTERY USING THE SAME

(75) Inventors: Xiang-Ming He, Beijing (CN); Li Wang, Beijing (CN); Jian-Jun Li, Beijing (CN); Jian-Wei Guo, Beijing (CN); Jian-Guo Ren, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 509 days.

(21) Appl. No.: 13/554,093

(22) Filed: Jul. 20, 2012

(65) Prior Publication Data

US 2013/0171517 A1    Jul. 4, 2013

(30) Foreign Application Priority Data

Dec. 28, 2011   (CN) .......................... 2011 1 0447347

(51) Int. Cl.
*H01M 4/66*    (2006.01)
*H01M 10/052*   (2010.01)
*H01M 4/13*    (2010.01)
*H01M 10/0525*  (2010.01)

(52) U.S. Cl.
CPC .............. *H01M 4/661* (2013.01); *H01M 4/667* (2013.01); *H01M 4/13* (2013.01); *H01M 4/663* (2013.01); *H01M 10/052* (2013.01); *H01M 10/0525* (2013.01); *Y02E 60/12* (2013.01); *Y02E 60/122* (2013.01)

(58) Field of Classification Search
CPC ..... H01M 4/667; H01M 4/663; H01M 4/661; H01M 4/13; H01M 10/0525; H01M 10/052; Y02E 60/12; Y02E 60/122
USPC ......... 429/233, 245, 209, 232, 217, 239; 29/2
See application file for complete search history.

(56) References Cited

U.S. PATENT DOCUMENTS

| | | | |
|---|---|---|---|
| 7,348,102 | B2 | 3/2008 | Li et al. |
| 2011/0265918 | A1 | 11/2011 | Fujita et al. |
| 2011/0281143 | A1 | 11/2011 | He et al. |
| 2012/0244430 | A1 | 9/2012 | Yamazaki et al. |
| 2013/0011732 | A1 | 1/2013 | Kim et al. |

FOREIGN PATENT DOCUMENTS

| | | |
|---|---|---|
| CN | 101882480 | 11/2010 |
| CN | 102208598 | * 10/2011 |
| JP | 10-106585 | 4/1998 |
| JP | 2002-352796 | 12/2002 |
| JP | 2008-536254 | 9/2008 |
| JP | 2010-89996 | 4/2010 |
| JP | 2012-216515 | 11/2012 |
| JP | 2013-16452 | 1/2013 |
| JP | 2013-73846 | 4/2013 |
| TW | 201143189 | 12/2011 |

* cited by examiner

*Primary Examiner* — Laura Weiner
(74) *Attorney, Agent, or Firm* — Novak Druce Connolly Bove + Quigg LLP

(57) ABSTRACT

The invention relates to a current collector. The current collector include a metal foil and a graphene film covered on at least one surface of the metal foil. The invention also relates to an electrode of an electrochemical battery and the electrochemical battery using the current collector.

12 Claims, 1 Drawing Sheet

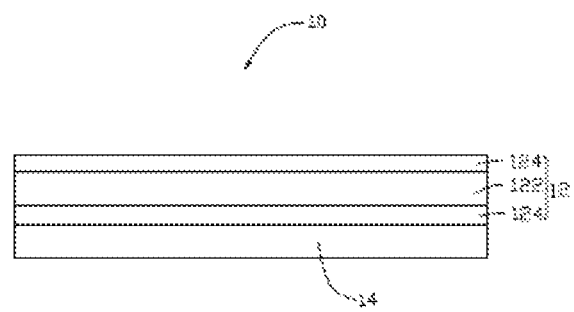

CURRENT COLLECTOR, ELECTRODE OF ELECTROCHEMICAL BATTERY, AND ELECTROCHEMICAL BATTERY USING THE SAME

FIELD OF THE INVENTION

The present disclosure relates to current collectors, electrodes of electrochemical batteries and electrochemical batteries using the electrode and current collector.

BACKGROUND

Current collectors are main components of electrochemical batteries. The current collectors are used as electron transfer channels for electrons formed in electrochemical reactions of the batteries to an external circuit to provide current. Performances of the electrochemical batteries are affected by the performances of the current collectors.

Materials of the current collectors are usually metal foils, such as copper or aluminum foils. These kinds of current collectors are easily oxidized to form passive films, or corroded with electrolytes of the electrochemical batteries to form insulating layers on the surface of the current collectors. The passive films or insulating layers may increase contact resistances between the current collectors and electrode active materials disposed thereon. Thus, capacities and efficiencies of energy transfer of the electrochemical batteries may be decreased.

SUMMARY OF THE INVENTION

What is needed, therefore, is to provide a current collector, which has a small contact resistance with electrode active material disposed thereon to improve the performance of the electrochemical battery.

A current collector comprises a metal foil comprising at least one surface and a graphene film coated on the at least one surface of the metal foil.

An electrode of an electrochemical batter comprises:
at least one current collector comprising:
a metal foil comprising at least one surface; and
a graphene film coated on the at least one surface of the metal foil; and
at least one electrode active material layer coated on at least one surface of the at least one current collector, and the graphene film electrically contacts the at least one electrode active material layer.

An electrochemical battery comprises the electrode.

Comparing with the prior art, the metal foil of the current collector is coated by the graphene film, therefore, the graphene film prevent the metal foil from directly contacting the corrosive electrolyte when using. whereby a corrosive reaction between the electrolyte and the current collector can be avoided. The metal foil is not easily corroded. Effect of the contact resistance by corrosive reactant between the current collector and the electrode material layer can be decreased. Because a conductivity of the graphene film is much larger than that of the metal foil, the graphene film directly contacts and closely combines the electrode material layer, the contact resistance between the current collector and the electrode active material thereby can be decreased.

DESCRIPTION OF THE DRAWING

FIG. 1 is a schematic structural view of an electrode of an electrochemical battery.

MAIN ELEMENT

Electrode of an electrochemical batter 10
Current collector 12
Metal foil 122
Graphene film 124
Electrode material layer 14

DETAILED DESCRIPTION

Reference will now be made to the drawings to describe a preferred embodiment of the current collector, electrode and electrochemical battery using the current collector in detail.

Referring to FIG. 1, one embodiment of an electrode 10 of an electrochemical battery includes a current collector 12 and an electrode active material layer 14 coated on a surface of the current collector 12.

The current collector 12 includes a metal foil 122 and a graphene film 124 coated on at least one surface of the metal foil 122. The graphene film 124 directly contacts the electrode active material layer 14.

A thickness of the metal foil 122 can be in a range from about 1 micrometer to about 200 micrometers. The metal foil 122 can be a commonly used cathode current collector or anode current collector of the electrochemical battery, such as copper foil or aluminum foil. The metal foil 122 can be a continuous layered structure.

The metal foil 122 has two surfaces defined by the width of the foil and two surfaces defined by the thickness. The graphene film 124 can be a continuous layered structure and continuously cover and directly contact at least one surface defined by the width of the metal foil 122. Two graphene films 124 also can respectively cover the two opposite surfaces defined by the thickness of the metal foil 122. The graphene film 124 includes at least one graphene sheet. In one embodiment, the graphene film 124 includes a plurality of graphene sheets. The plurality of graphene sheets can be pieced together to form the graphene film 124 with a large area. The plurality of graphene sheets also can be stacked or overlapped to form the graphene film 124. Each of the plurality of graphene sheets can include about one to ten layers of graphene. A thickness of the graphene film 124 can be in a range from about 0.8 nanometers to about 5 micrometers. In one embodiment, the thickness of the graphene film 124 is in a range from about 0.8 nanometers to about 1 micrometer. In another embodiment, the graphene film 124 is one graphene sheet having the thickness of about 0.8 nanometers. In one embodiment, the graphene film has a thickness of about 50 nanometers and consists of pristine graphene. The pristine graphene is an allotrope of carbon, and its structure is a one-atom-thick planar sheet of $sp^2$-bonded carbon atoms that are densely packed in a honeycomb crystal lattice. The graphene sheet has an excellent conductivity. A movement velocity of electrons in the graphene sheet can reach to about $1/300$ of a velocity of light which is much larger than the movement velocity of the electrons in other conductors. In addition, the graphene sheet has a great specific surface energy itself and can make the metal foil 122 and the electrode active material layer 14 firmly combined together. Therefore, a contacting resistance between the metal foil 122 and the electrode active material layer 14 can be decreased and thus the conductivity of the current collector 12 can be increased by disposing the graphene film 124 on the surface of the metal foil 122.

The graphene film 124 can be formed by the following steps:

S1, providing a plurality of graphene sheets in powder form and dispersing the plurality of graphene sheets in a volatile solvent to form a graphene dispersion;

S2, coating the graphene dispersion on at least one surface of the metal foil 122 to form a coating layer; and S3, removing the volatile solvent to form the graphene film 124 on the at least one surface of the metal foil 122.

In step S1, the plurality of graphene sheets can be fabricated by a mechanical exfoliation method, oxidation-reduction method, or chemical vapor deposition method. The volatile solvent can be an organic solvent or water. The organic solvent can be at least one of ethanol, acetone, ether, and chloroform. The graphene dispersion can be stirred to make the plurality of graphene sheets be uniformly dispersed in the volatile solvent. The stirring method can be at least one of magnetically stirring, mechanical stirring, and ultrasonically vibrating. A mass percentage of the plurality of graphene powders to the graphene dispersion can be in a range from about 0.05 wt % to about 5 wt %. The larger the mass percentage, the thicker the graphene film 124.

In step S2, the coating method can be knife coating, brushing, spraying, electrostatic coating, roll coating, screen printing, or dip coating. In one embodiment, the graphene dispersion is dip coated on the surface of the metal foil 122. The dip coating includes the steps of completely dipping the metal foil 122 in the graphene dispersion, and then lifting the metal foil 122 out from the graphene dispersion. A dipping time period can be in a range from about 30 seconds to about 5 minutes. A lifting speed can be in a range from about 1 centimeter per minute (1 cm/min) to about 20 cm/min. In one embodiment, the dipping time period is about 2 minutes, and the lifting speed is about 10 cm/min. The surface of the metal foil 122 can be continuously coated with a graphene dispersion film during the lifting process. The graphene dispersion film has a uniform thickness. In addition, the steps of dipping and lifting can be repeated several times or adjusting the concentration of the graphene dispersion to control the thickness and uniformity of the coating layer.

In step S3, the volatile solvent can be removed by heat drying or air drying. The graphene can firmly adhere on the surface of the metal foil 122 for a surface tension of the volatile solvent and specific surface energy of the graphene sheet. Therefore, a dense and continuous graphene film 124 can be formed on the surface of the metal foil 122.

The electrode active material layer 14 includes an electrode active material, a conductive agent, and a binder uniformly mixed together. The electrode active material can be a cathode active material or anode active material commonly used in the electrochemical battery. In one embodiment, the electrochemical battery is a lithium ion battery. The cathode active material can be doped or undoped spinel lithium manganese oxide, layered lithium manganese oxide, lithium nickel oxide, lithium cobalt oxide, lithium iron phosphate, lithium nickel manganese oxide, lithium nickel cobalt oxide, or any combination thereof. The anode active material can be lithium titanate, graphite, acetylene black, organic cracking carbon, mesocarbon microbeads, or any combination thereof. The conductive agent can be at least one of graphite. Polyvinylidene Fluoride, Polytetrafluoroethylene, and Styrene-Butadiene Rubber. The electrode active material, the conductive agent, and the binder can be other commonly used materials.

Two electrode active material layers 14 can be respectively coated on the two opposite surfaces of the current collector 12. The electrode active material layer 14 can be firmly combined with graphene film 124 via the binder.

If the electrode 10 is used in the electrochemical battery, the graphene film 124 can prevent a direct contact between the electrolyte and the metal foil 122. Thus, a corrosion of the metal foil 122 by the electrolyte can be prevented. Accordingly, an increasing of the contacting resistance between the current collector 12 and the electrode active material layer 14 can be avoided. In addition, the metal foil 122 can be firmly combined with the electrode active material layer 14 due the large specific surface energy of the graphene. Therefore, a conductivity of the current collector 12 can be increased.

Example 1

The electrode 10 is provided. The electrode 10 is an electrode of a lithium ion battery. The metal foil 122 is commonly used cathode current collector of the lithium ion battery, such aluminum foil or titanium foil. The conductive agent can be at least one of graphite, Polyvinylidene Fluoride, Polytetrafluoroethylene, and Styrene-Butadiene Rubber. The electrode active material can be commonly used cathode active materials, such as doped or undoped spinel lithium manganese oxide, layered lithium manganese oxide, lithium nickel oxide, lithium cobalt oxide, lithium iron phosphate, lithium nickel manganese oxide, lithium nickel cobalt oxide, or any combination thereof. A thickness of the graphene film 124 is about 100 micrometers.

Example 2

Example 1 is substantially the same to Example 2. The difference is the metal foil is commonly used anode current collector of the lithium ion battery, such as copper foil or nickel foil. The electrode active material of the electrode active material layer 14 is anode active material, such as lithium titanate, graphite, acetylene black, organic cracking carbon, mesocarbon microbeads, or any combination thereof.

The metal foil of the current collector is coated by the graphene film, therefore, the graphene film prevent the metal foil from directly contacting the corrosive electrolyte when using. whereby a corrosive reaction between the electrolyte and the current collector can be avoided. The metal foil is not easily corroded. Effect of the contact resistance by corrosive reactant between the current collector and the electrode material layer can be decreased. Because a conductivity of the graphene film is much larger than that of the metal foil, the graphene film directly contacts and closely combines the electrode material layer, the contact resistance between the current collector and the electrode active material thereby can be decreased.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A current collector comprising:
a metal foil comprising at least one surface; and
a graphene film coated on the at least one surface of the metal foil;
wherein a thickness of the graphene film is in a range from about 0.8 nanometers to about 50 nanometers.

2. The current collector of claim 1, wherein the graphene film is a continuously layered structure.

3. The current collector of claim 1, wherein the graphene film comprises at least one graphene sheet.

4. The current collector of claim 1, wherein the graphene film consists of pristine graphene.

5. The current collector of claim 1, wherein the metal foil is selected from the group consisting of aluminum foil, copper foil, titanium foil, and nickel foil.

6. The current collector of claim 1, wherein the current collector consists of the metal foil and the graphene film.

7. The current collector of claim 6, wherein the graphene film consists of one graphene sheet with a thickness of about 0.8 nanometers.

8. The current collector of claim 1, wherein the metal foil has two surfaces defined by widths of the metal foil and two surfaces defined by the thickness, and the graphene film covers and is in direct contact with the surfaces defined by the widths and the thickness.

9. An electrode of an electrochemical battery comprising:
at least one current collector comprising:
a metal foil comprising at least one surface; and
a graphene film coated on the at least one surface of the metal foil, wherein a thickness of the graphene film is in a range from about 0.8 nanometers to about 50 nanometers; and
at least one electrode active material layer coated on at least one surface of the at least one current collector, and the graphene film electrically and directly contacts the at least one electrode active material layer.

10. The electrode of claim 9, wherein the graphene film consists of pristine graphene.

11. The electrode of claim 9, wherein the at least one electrode active material layer comprises an electrode active material, a conductive agent, and a binder uniformly mixed with each other.

12. An electrochemical battery comprising a cathode and an anode, at least one of the cathode and the anode comprising:
at least one current collector comprising:
a metal foil comprising at least one surface; and
a graphene film directly contacting and covering the at least one surface of the metal foil, wherein the graphene film is one graphene sheet with a thickness of about 0.8 nanometers; and
at least one electrode active material layer coated on at least one surface of the at least one current collector, and the graphene film electrically contacts the at least one electrode active material layer.

* * * * *